Oct. 22, 1968 A. E. HILL 3,407,294
METHOD FOR REDISTRIBUTING LASER LIGHT
Filed March 1, 1966

INVENTOR.
ALAN E. HILL
BY
ATTORNEYS

United States Patent Office 3,407,294
Patented Oct. 22, 1968

3,407,294
METHOD FOR REDISTRIBUTING LASER LIGHT
Alan E. Hill, Ann Arbor, Mich., assignor to
Lear Siegler, Inc.
Filed Mar. 1, 1966, Ser. No. 541,412
6 Claims. (Cl. 240—46.01)

ABSTRACT OF THE DISCLOSURE

A method to redistribute laser light into a non-coherent uniform beam while retaining other properties of laser light, e.g., temporal coherence. This is accomplished by placing a scattering medium outwardly of a laser in the path of the light emanating therefrom. A collecting medium is placed outwardly of the scattering medium and serves to collect the forward scattered light transmitted by the scattering medium and such collected light is thence transmitted by the collecting medium with a controlled divergence. The scattering medium may comprise ground glass and the collecting medium may comprise a lens or a system of lenses.

---

This invention relates to a method and apparatus for redistributing laser light into a non-coherent uniform beam of variable divergence, suitable for applications such as photographic illumination.

A maser is a solid state microwave amplifier. When substances such as ruby are used as an amplifier in the visible portion of the radiation spectrum, the device is known as an optical maser, or laser. The word "Laser" is derived from the words "light amplification by stimulated emission of radiation." The terms "optical maser" and "laser" are both used in describing devices which produce electromagnetic radiation by stimulated emission. Such structures are already well known and commercially available. Such structures are characterized by their ability to produce electromagnetic radiation which is very directional, extremely powerful, essentially mono-chromatic and coherent. The waves are spatially coherent because the wave fronts are planes perpendicular to the direction of propagation. Since the output is essentially mono-chromatic, there is also time coherence in that there is a fixed phase relation between the portion of the wave emitted at one instant and the wave emitted after a fixed time interval.

This coherency can be better understood by imagining the reaction on the surface of water when a pebble strikes it. The waves extend coherently about the spot where the pebble strikes the water. However, if a handful of pebbles are thrown on the surface of water, the total result is a non-coherent reaction since the individual waves caused by the different sized pebbles landing in different places react incoherently with one another rather than always amplifying one another. Because of the coherency of pulsed laser light, it is spatially non-uniform and therefore not suitable for photographic illumination and various other uses. It is therefore the object of this invention to provide a method and apparatus to redistribute laser light into a non-coherent uniform beam suitable for such applications while retaining other properties of laser light.

A further object of the invention is the provision of such a method and apparatus which enables one to vary the divergence of the beam of non-coherent redistributed laser light.

A further object of the invention is the provision of such a method and apparatus which is both effective and economically practical for purposes of photographic illumination and the like.

Figure 1:
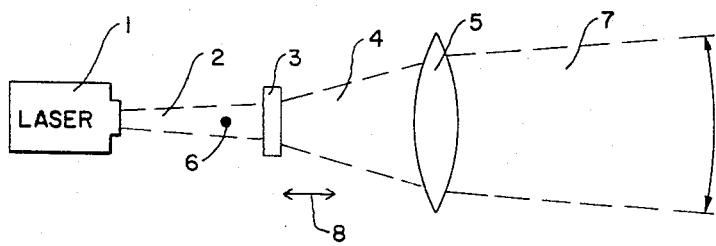
Figure 2:
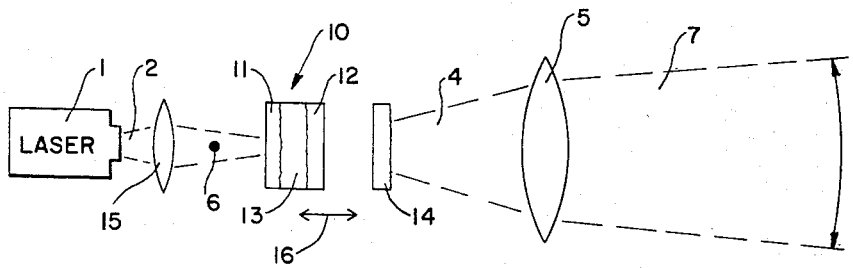
Figure 3:
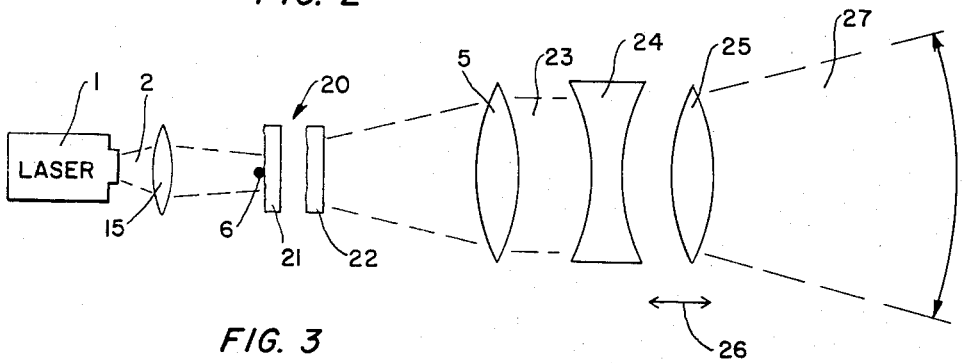

These and other objects of this invention will become apparent to those skilled in the relevant arts upon reading the following specification in conjunction with the accompanying drawing, wherein:

FIG. 1 is a schematic diagram illustrating the method and apparatus of this invention;
FIG. 2 is a schematic diagram similar to FIG. 1, showing certain modifications; and
FIG. 3 is a schematic diagram similar to FIG. 1, showing further modifications.

Briefly, this invention relates to a method and apparatus for redistributing laser light into a non-coherent uniform beam comprising the steps of positioning a scattering medium in the path of the laser light and collecting forwardly scattered light with a lens.

Referring more specifically to the drawing, the reference numeral 1 designates a conventional laser, well known and described hereinbefore, which emits a pulsed beam 2 of coherent light. A scattering medium 3 is placed in the path of the beam 2. This medium is characterized by its ability to scatter the coherent light in the beam 2 as it strikes it. It has been found that ground glass comprises an excellent scattering medium. One or both surfaces of the glass may be ground and roughened. This glass serves to scatter the coherent light in all directions, much of it being scattered forwardly in the direction of travel of the beam. Means may be provided to reduce back scattering energy losses as will be described hereinafter.

The light which is scattered by the glass 3 is designated by the reference numeral 4 and collected by a lens 5. The collection is best achieved with the use of a small F-number lens having a large diameter. For example, a lens having an 8 inch diameter and a 10 inch focal length is suitable. The collected light will be transformed into a parallel beam of uniform cross-section if the scattering medium is placed at the focal point 6 of the lens 5. However if laser light were actually focused to a point on the scattered surface, there might not be a sufficient number of intersecting scattering centers to completely spoil coherence. Further, power concentrations on the surface of the scattering medium could become intolerable. Therefore, a sufficiently large scattering area should be used, for example a beam ¼ inch in diameter. By moving the medium 3 slightly forwardly from the focal point 6, the collected light designated by the reference numeral 7 is emitted in a diverging column. The degree of divergence of this column is determined by movement of the glass 3 with respect to the lens 5 as designated by the arrow 8. Thus, with the method and system as described, the divergence of the beam of collected, non-coherent light 7 may be varied by relative movement of the glass and lens in the direction shown by the arrow 8.

The method illustrated in FIG. 2 is similar to that of FIG. 1 in that a laser 1 emits a beam 2 which is scattered forwardly at 4, collected by a lens 5 with a focal point 6, a diverging beam of non-coherent light 7 being provided. In this embodiment, to reduce back scattering energy losses, the scattering medium is immersed into a fluid which lowers the ratio of the indices of refraction across the ground glass surface boundary. In the embodiment shown, the scattering medium 10 includes a pair of ground glass plates 11 and 12, water interfaced at 13. A third ground glass plate 14 is also provided. It has been found that back scattering energy losses can be reduced with a scattering medium of this type although other capabilities of the system may suffer somewhat. In the embodiment shown in FIG. 2, a small lens 15 is provided in the path of the beam 2 to provide a precise scattering area on the scattering medium 10. The apparatus shown in FIG. 2 operates in the same manner as already described with respect to FIG. 1, movement of the scattering medium 10 with respect to the lens 5 in the directions shown by the arrow 16 varying the divergence of the collected light.

Turning to FIG. 3, an embodiment is shown which envisions scattering of the beam 2 emitted from a laser 1 essentially at the focal point 6 of the lens 5. In this instance, a wet ground glass 21 and a dry ground glass 22 comprise the scattering medium 20. A lens 15 directs the beam 2 onto the wet ground glass 21 at essentially the focal point of the lens 5, and through the glass 22, a column 23 of collected non-coherent light being emitted through the lens 5. A pair of lenses 24 and 25 are positioned in the path of this column of light. By movement of the lenses 24 and 25 with respect to one another, as shown by the arrow 26, a beam 27 of varying divergence is produced.

The beam of laser light which has been redistributed into a non-coherent uniform beam is now suitable for use in photographic processes and the like. Other uses for laser light so redistributed are envisioned in U.S. application Ser. No. 530,913, entitled Method and Apparatus for Detecting Objects, filed Mar. 1, 1966, and also assigned to the owner of this application. It should be understood that there may be appropriate variations of the principles and steps set forth hereinbefore. With such variations, certain capabilities are enhanced while others might suffer. However, the present system can be modified to fulfill many specific applications to the best degree.

While only certain embodiments of this invention and steps in the method thereof have been shown and described, it might be possible to practice the invention through the utilization of certain other embodiments. These embodiments are to be included as part of this invention unless the following claims specifically state otherwise.

I claim:

1. A method for redistributing laser light into a non-coherent uniform beam comprising the steps of positioning a scattering medium in the path of the laser light and collecting forwardly-scattered light with a lens, said scattering medium positioned at the focal point of said collecting lens, positioning diverging and converging lenses on the side of said collecting lens opposite from said scattering medium and moving said diverging and converging lenses with respect to one another for varying the divergence of the collected light.

2. A method for redistributing laser light into a non-coherent uniform beam comprising the steps of positioning a scattering medium in the path of the laser light and collecting forwardly-scattered light with a lens, said scattering medium positioned between said collecting lens and its focal point and near said focal point, and moving said scattering medium with respect to said collecting lens for varying the divergence of the collected light.

3. A method for redistributing laser light into a non-coherent uniform beam comprising the steps of positioning a scattering medium in the path of the laser light and collecting forwardly-scattered light with a lens, said scattering medium comprising ground glass, said collecting lens having a small F-number and a large diameter, said glass positioned at the focal point of said collecting lens, positioning diverging and converging lenses on the side of said collecting lens opposite from said scattering medium and moving said diverging and converging lenses with respect to one another for varying the divergence of the collected light.

4. The method of claim 3, said glass immersed in a fluid lowering the indices of refraction across said glass surface.

5. A method for redistributing laser light into a non-coherent uniform beam comprising the steps of positioning a scattering medium in the path of the laser light and collecting forwardly-scattered light with a lens, said scattering medium comprising ground glass, said collecting lens having a small F-number and a large diameter, said glass positioned between said collecting lens and its focal point and near said focal point, and moving said glass with respect to said collecting lens for varying the divergence of the collected light.

6. The method of claim 5, said glass immersed in a fluid lowering the indices of refraction across said glass surface.

References Cited

UNITED STATES PATENTS

| 3,262,359 | 7/1966 | Carpenter | 88—24 |
| 2,014,688 | 9/1935 | Mabboux | 88—24 |
| 2,496,681 | 2/1950 | Stephens | 240—107 XR |
| 2,586,436 | 2/1952 | Planer | 88—24 |
| 3,247,758 | 4/1966 | Turner | 88—14 |
| 3,289,101 | 11/1966 | Masters et al. | 331—94.5 |

NORTON ANSHER, Primary Examiner.

RICHARD M. SHEER, Assistant Examiner.